US006278690B1

(12) United States Patent
Herrmann et al.

(10) Patent No.: US 6,278,690 B1
(45) Date of Patent: Aug. 21, 2001

(54) LOCAL AREA NETWORK FOR RECONFIGURATION IN THE EVENT OF LINE RUPTURES OR NODE FAILURE

(75) Inventors: Christoph Herrmann; Yonggang Du; Klaus P. May, all of Aachen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/057,651

(22) Filed: Apr. 9, 1998

(30) Foreign Application Priority Data

Apr. 12, 1997 (DE) ............................................. 197 15 262

(51) Int. Cl.$^7$ ....................................................... H04J 1/16
(52) U.S. Cl. .......................... 370/224; 370/909; 370/395
(58) Field of Search ................................... 370/216, 217, 370/218, 221, 222, 223, 224, 225, 241, 242, 245, 909, 258, 230, 234, 376, 395, 404, 405, 406

(56) References Cited

U.S. PATENT DOCUMENTS

| 5,179,548 | 1/1993 | Sandesara | 370/222 |
|---|---|---|---|
| 5,469,428 | 11/1995 | Tokura | 370/224 |
| 5,600,652 | * 2/1997 | Kreamer | 370/396 |
| 5,600,795 | * 2/1997 | Du | 370/397 |
| 5,745,476 | 4/1998 | Chauduri | 370/222 |
| 5,982,747 | * 11/1999 | Ramfelt | 370/224 |
| 6,076,116 | * 6/2000 | Duque-Anton | 709/251 |
| 6,130,876 | * 10/2000 | Chaudhuri | 370/228 |

FOREIGN PATENT DOCUMENTS

| 19532422 | 1/1997 | (DE) . |
|---|---|---|
| 0641105A2 | 3/1995 | (EP) . |

* cited by examiner

Primary Examiner—Douglas Olms
Assistant Examiner—Ricardo M. Pizarro
(74) Attorney, Agent, or Firm—David R. Treacy

(57) ABSTRACT

A local area network with a plurality of nodes for transmitting cells in the asynchronous transfer mode over a ring system having two opposite direction rings. In the event of a defect in a transmitting line from a node, or a defect in a neighboring node, a loop is formed in this node to reroute messages from one ring to the other. First, a node detecting a defect transmits a message of a first type to all other involved nodes, identifying the location of the detected defect. This information is entered in a respective status table in each node. After evaluating the information in its status table, a node which should form a loop does so, and sends a message of a second type identifying the loop to any nodes which do not already have this information.

12 Claims, 7 Drawing Sheets

LOCAL AREA NETWORK FOR RECONFIGURATION IN THE EVENT OF LINE RUPTURES OR NODE FAILURE

BACKGROUND OF THE INVENTION

The invention relates to a local area network operating in the asynchronous transfer mode (ATM) for transmitting cells, comprising a plurality of network nodes which are provided for forming a loop in the event of a defect of an assigned transmitting line or an adjacent network node.

Such a local area network (LAN) which operates in the asynchronous transfer mode is known from DE 195 32 442 C1. This network contains a plurality of ring systems with various network nodes which are mutually coupled in a ring system via a single or a double ring. The network nodes have station connections via which they are coupled either to a station or to another network. A network node detects a node failure or a line rupture when it no longer receives cells from a neighboring node via a line of a ring. In the event of a node failure or line rupture, the network node detecting this defect informs a network management system of the location of the line rupture. The network management system controls the reconfiguration of the network in that the system informs the network node whose transmitting line has a defect. This network node then forms a loop so that cells are no longer routed to the defective line, but to the other ring.

When an asynchronous transfer mode is used in a system, payload, for example, television, picture or sound signals, is transmitted in blocks of fixed length through arrangements for digital signal processing. A cell having a predetermined number of bytes (for example 53 bytes) is denoted a fixed-length block. Each cell comprises a header field having a length of 5 bytes and an information field in which the payload is accommodated having a length of 48 bytes. Such a header field are contains address information, data for fault detection and data for control indication bytes. Address information comprises trunk identifiers and link identifiers. For transmitting a cell, a virtual channel is rendered available based on the link identifier which is also referred to as a VCI (Virtual Channel Identifier). As a rule, a VCI is changed once it has reached a switching center. A group of virtual channels is denoted a virtual path (VPI=Virtual Path Identifier) featured by the trunk identifier.

SUMMARY OF THE INVENTION

It is an object of the invention to provide a local area network operating in the asynchronous transfer mode in which a reconfiguration of the network is carried out in a different manner if at least one line rupture or node failure occurs.

The object is achieved by a local area network of the type defined in the opening paragraph operating in the asynchronous transfer mode, in that a network node detecting a defect transmits a cell containing a message of a first type about the location of the defect to all the other network nodes involved, in that the network node detecting the defect and each network node receiving the message of the first type enters the location of the defect in its own assigned status table and in that, after the evaluation of the respective status table in a network node, the network nodes form a loop which does not use the defective transmitting line or attempt exchanging cells with an isolated or defective node.

The invention is based on the idea that a network node detecting the failure of a network node or a line rupture informs all the other network nodes involved about this defect by means of a message of a first type, so that these network nodes are aware that a connection can no longer be established with certain users. A network node cannot determine exactly whether the defect relates to a line rupture or a node failure. Only as a result of a loss of synchronization or by transmitting certain cells can there be established that the detecting network node no longer receives cells from a neighboring node over its receiving line. The network node detecting a defect then sends a message of a first type which contains information about a fault on a transmitting line of the neighboring node to all the other network nodes that can be reached and are involved. This involvement relates, for example, to all the nodes of a ring system in the local area network.

A network node receiving the message of a first type enters the message contents in an assigned status table and establishes, after evaluation, where the location of the defect is and whether an action is to be carried out. If the network node establishes that, for example, it can no longer exchange cells with another network node, that is to say, that it can no longer receive cells from the other network node or send cells to it, a loop is formed, In particular, a loop is formed in the network node whose transmitting line shows a defect. In addition, there are cases where a network node is to establish a loop even when a transmitting line is still in working order.

For enabling a network node to identify the location of the defect, the network node detecting a defect sends a message of a first type which contains details about the network node that has a transmitting line that no longer supplies cells and details about the ring to which the transmitting line belongs that no longer conveys any cells. The network node detecting a defect then establishes from which receiving line it no longer receives cells.

Such a loop is created to run either from the inner ring to the outer ring or the other way around. Where a transmitting line is defective cells intended for the defective line are looped back and transmitted over the other ring. In the case where a node can no longer exchange cells with a neighboring node or with a neighboring group, cells intended for the neighboring node are looped between rings and retransmitted over the ring which contains the receiving line that is not supplying cells. Thus, after the creation of a loop, cells are not transmitted to an isolated node and not to an isolated group either.

A network node further generates a message of a second type which indicates no defect or fault, but a planned creation, or creation to be planned of a loop. This message of the second type is necessary for the network nodes to know whether they can still reach certain network nodes and can set up connections thereto. This message, which contains details about the network node and about the ring which is no longer useful for conveying cells because of the creation of the loop, is generated only when at least one other network node does not have these details. This is the case, for example, when there is an isolated group of network nodes. This message of the second type is only sent for informative purposes and does not entail the creation of a loop.

A network node includes a switching device which carries out the transfer of received cells and thus also the creation of a loop. A control arrangement in the network node controls the switching device and is used for changing and evaluating the status table.

These and other aspects of the invention will be apparent from and elucidated with reference to the embodiments described hereinafter.

DESCRIPTION OF THE PREFERRED EMBODIMENTS

Figure 1:
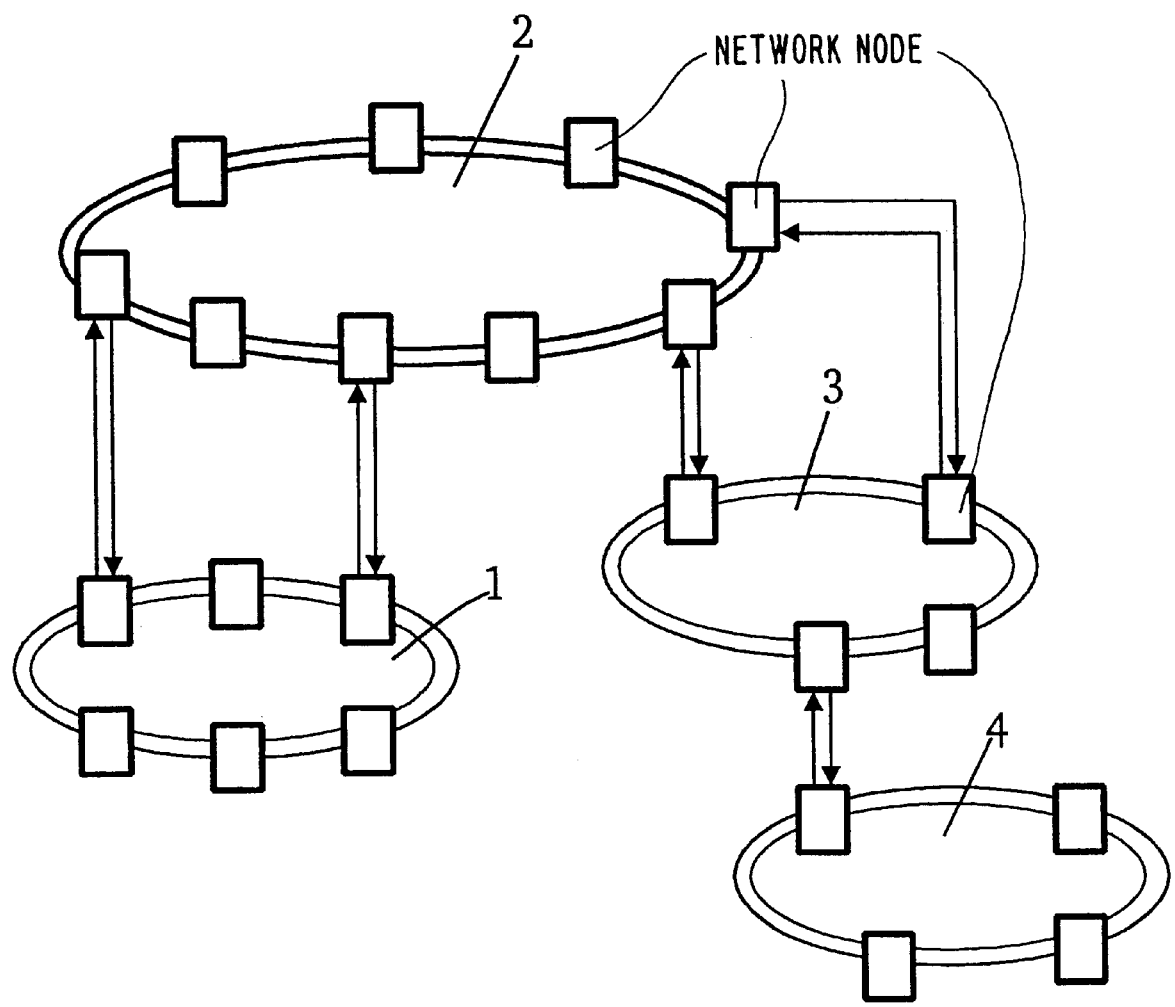
FIG. 1 shows a local area network.

FIG. 1 shows an exemplary embodiment of a local area network comprising four ring systems 1 to 4 which have each two rings. A ring is understood to mean a closed signal path via a plurality of the network nodes. The ring systems 1 to 4 form each formed by two rings in opposite directions, that is to say, the signals run in opposite directions on the rings. A network node shown as a rectangle in the ring systems 1 to 4 comprises a network interface with four ring connections and two station connections.

Either a station or a network interface of another ring system is connected to the station connections. In FIG. 1, for example, for the ring system 2 a total of five network interfaces are connected to stations and four network interfaces are connected to network interfaces of the ring systems 1 and 3. A station may be, for example, a telephone,. a videophone, a personal computer or a workstation. The messages or information respectively, originating from the stations or network interfaces respectively, are transmitted in cells in the asynchronous transfer mode. A cell contains a header field of 5 bytes and an information field of 48 bytes. The information contained in the header field of the cell is used more particularly for addressing and carrying out switch functions.

Figure 2:
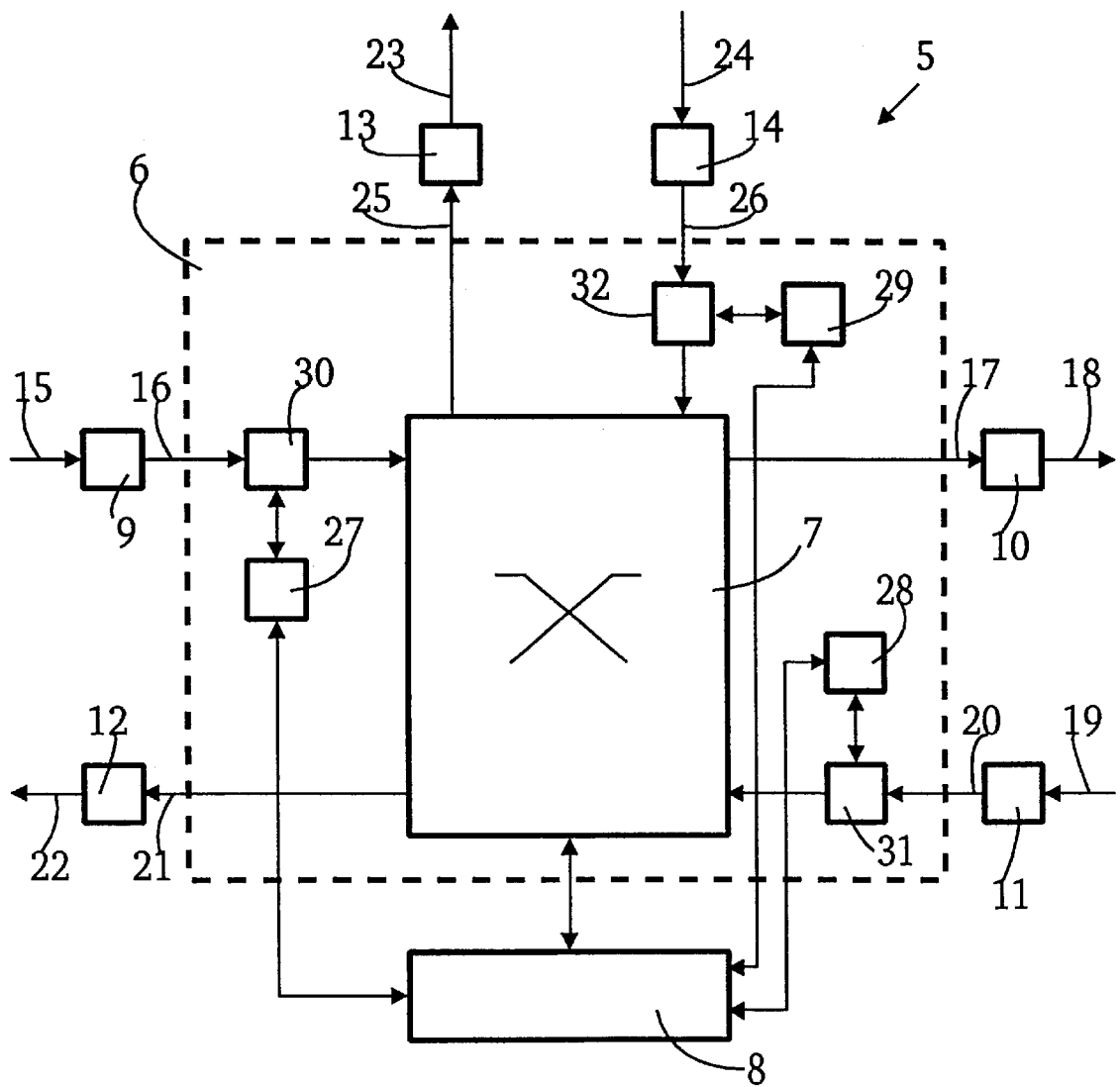
FIG. 2 shows a network interface that can be used in the local area network shown in FIG. 1, and FIGS. 3 to 14 show ring systems of a local area network after one or various line ruptures.

A network interface 5 having four ring connections is shown in more detail in FIG. 2. The network interface 5 contains a switching device 6 and a control arrangement 8. The switching device 6 which contains a switch 7 is coupled to ring and station connections via alignment circuits 9 to 14 and has the function of switching the cell stream further. The alignment circuits 9 to 14 may comprise, for example, converter arrangements for mapping the cells into higher-order transport frames (for example, into transport frames of the synchronous digital hierarchy (SDH)), or buffer memories for clock alignment when the cells are transferred without being mapped into a higher-order transport frame.

The alignment circuit 9 is coupled, on the one hand, to a receiving ring connection 15 of a first ring and, on the other hand, to a connection 16 which leads to the switching device 6. The alignment circuit 10 is coupled to the switching device 6 via a connection 17 and applies a cell stream to a send ring connection 18 of the first ring. A cell stream from a receiving ring connection 19 of a second ring is received by the alignment circuit 11 which applies a cell stream to the switching device 6 via a connection 20. From a connection 21 of the switching device 6, the alignment circuit 12 receives cells which are transferred to a send ring connection 22 of the second ring.

A station or ring system sending connection 23 is coupled to the network interface 5 via the alignment circuit 13 and so is a station or ring system receiving connection 24 via the alignment circuit 14. The alignment circuit 13, which receives a cell stream from the switching device 6, is coupled to the switching device 6 via a connection 25. The alignment circuit 14, which is supplied with a cell stream from a network interface of another ring system or a station, is coupled via the station connection 24 to a station or to a network interface of another ring system, and to the switching device 6 via a connection 26. If no cell conversion or clock alignment is necessary, the alignment circuits 9 to 14 are not needed.

The control arrangement 8 is provided for controlling the switching device 6 and for further control functions (for example, call set up and disconnection). The control arrangement 8 which may be arranged as a microprocessor, also receives and generates cells for these functions.

In addition to the switch 7, the switching device 6 includes three path memories 27, 28 and 29 and three receiving circuits 30, 31 and 32. The header fields of cells coming in via connections 16, 20 and 26 are evaluated in the receiving circuits 30, 31 and 32.

Address information contained in the header field is used for addressing various tables for the path memories 27, 28 and 29 connected to the receiving circuits 30, 31 and 32. The data stored in the tables are used by the respective receiving circuits 30, 31 and 32 for organizing the further processing and transport of the cell. For example, the receiving circuit 30 can copy the cell and add new address information thereto. The original cell is switched, for example, by the switch 7 to the station connection 23 and the copied cell to the alignment circuit 10. Furthermore, there is the possibility of the switch 7 carrying out this copy function.

The receiving circuit 30 is coupled to the buffer memory (alignment circuit) 9 via the connection 16 and transfers received cells to the switch 7. The path memory 27 is connected to the receiving circuit 30. The receiving circuit 31 is connected to the path memory 28, receives cells from the buffer memory (alignment circuit) 11 and transfers cells to the switch 7. Between the switch 7 and the connection 26 is arranged the receiving circuit 32 which is connected to the path memory 29.

Two types of payload cells are transmitted via the ring connections 15 and 18 of the first ring and via the ring connections 19 and 22. On the one hand, user cells containing in the information field, for example, messages or data of the user of a previously established connection and, on the other hand, signalling cells containing overhead bytes in their information field.

In the following, the ring connections 15 and 19 will also be referred to as receiving lines assigned to the network node, and the ring connections 18 and 22 as the transmitting lines assigned to the network node.

Certain bits in the header field of a cell are reserved for the VCI (Virtual Channel Identifier). In conformity with standardization proposals, this indication contains an indirect addressing for the destination of a cell and thus denotes a virtual channel. Furthermore, certain bits in the header field of the cell are reserved for the VPI (Virtual Path dentifier) which indicates a group comprising a plurality of virtual channels.

Certain bits of the VCI and of the VPI are used in this exemplary embodiment for other information than discussed in the standardization proposals. The VPI contains information about the address (address information) or destination (network node) of a cell in a ring system. The VCI is used for indicating the user-related identifier for a channel, the kind of channel and the kind of cell. Furthermore, the VCI is used as an address for a ring system.

The control arrangement 8 of the network interface 5 controls the setting up of a connection of an assigned station to other stations. The respective control procedures for setting up connections and for disconnections may be taken, for example, from European patent application EP-0 641 105 A2.

The path memories 27 to 29 of the switching device 6 contain information which is evaluated by the assigned receiving circuits 30 to 32 for organizing the further processing and transfer of the received cells. For example, a cell may be given another address, may be copied or erased. The path memories 27 to 29 may be changed by the control arrangement 8, for example, in the event of a fault (for example, cable rupture or line rupture, respectively).

With a connection between a network node of a first ring system and a network node of a second ring system, the VPI and the VCI of a cell are to be changed when the cell changes from one ring system to another. For this purpose, respective entries have been made in the path memories prior to the setting up of the connection.

When a fault occurs in the local area network, various measures are carried out by the network node detecting a fault. For example, a ring connection or a station connection may be interrupted, or a network node may break down (node failure). Such a fault is detected by the control arrangement 8 of a network interface 6, or of a network node respectively, for example, after a neighboring node has transmitted signaling cells which are not received, or as a result of a loss of synchronization. A network node cannot detect a node failure per se, but establishes that no cells no longer arrive from the line of a failing neighboring node. Thus, a node failure can be interpreted as a twofold line rupture as will be discussed in the following.

A network node carries out various actions after a line rupture has occurred. The control arrangement 8 of a network node, which control arrangement detects a line rupture on the associated receiving line of the inner or outer ring, causes a cell to be transmitted carrying over both rings a message about a fault, which message is a first type of message. The cell with the first type of message, which cell contains information about the location of the fault, is considered to belong to a broadcast connection and is thus sent to all the other network nodes of the ring system. A first type of message (message about a fault) indicates the network node whose transmitting line has a line rupture and the ring on which the fault has occurred.

There is another message relating to a fault, sent over the network in a cell by a network node, which message is of a second type. This is a message about a loop planned to be established in a network node. It is presumed then that the associated transmitting line is not defective. Establishing a loop in a node is defined as a rerouting that takes place in the switching device 6 of the network node, that is to say, incoming cells are transferred either from the inner to the outer ring or from the outer to the inner ring. For this purpose, the table entries in the associated path memories 27 to 29 of the switching device 6 are changed. Then, based on the table entries in the path memories 27 to 29, the switching device 6 no longer switches a cell to the same ring but to the other ring.

The control arrangement 8 of a network node contains a status table which has entries about line ruptures and loop actions of each network node of the ring system. The status table indicates the network node whose assigned transmitting line has a fault and/or which has established a loop, and the ring to which cells can no longer be sent by the respective network node because of the line rupture or the established loop. The status table also has an entry for a network node of which the transmitting line has a fault and which has established a loop or has only carried out one loop action. Such an entry will be called a pattern in the following. The pattern is transmitted in a first or second type of message in the form in which the pattern is entered in the table.

When a network node receives a message, the received pattern is entered in the associated status table. This entry is made by the associated control arrangement 8. For simplicity, the functioning of the control arrangement 8 will not be indicated explicitly, but explained as a function of the respective network node. After the message has been received, the status table is evaluated which may trigger a loop action. If a loop action has been carried out by a network node, a message of the second type about the loop action may be sent over the two rings from the network node to all the other network nodes, as will be explained later.

If a fault is detected by a network node, this network node changes its status table. In the status table is entered which network node is affected by the line rupture and on which ring the fault has occurred. Subsequently, the entry is sent as a first type of message about a defect to all the other network nodes.

The procedures for a single or simplex line rupture will be further explained with reference to FIG. 3. The ring system shown in FIG. 3 comprises an inner ring and an outer ring and four network nodes 33 to 36. The inner ring connection between network nodes 34 and 35 is said to be defective. Such a defect is detected by the network node 35 which then makes changes in a status table and sends a message P1 about a defect (first type of message) over the inner and outer rings to the other network nodes. Sending the message P1 from the network node 35 to the inner ring in the direction of the network node 36 is indicated by an arrow 37 and sending the message P1 from the network node 35 to the outer ring in the direction of the network node 34 is denoted by an arrow 38. The network node 34 which receives the message P1 twice reacts upon the arrival of the first message P1 by making entries in its status table, evaluating the entries and creating a loop from the inner to the outer ring as a result of the evaluation. Due to the processing of the message P1 arriving first over the inner or outer ring respectively, the message P1 subsequently arriving over the outer or inner ring respectively, is discarded. Entries about the fault are also made in the status tables of the other network nodes 33 and 36 after message P1 has come in, which network nodes also evaluate their respective status tables. The evaluation in the network nodes 33 and 36, however, does not result in any action. In the network node 34, cells on the inner ring are then led to the outer ring and arrive at the destination node over the outer ring instead of the inner ring. All the actions subsequent to a simplex line rupture are terminated hereby in the respective network nodes 33 to 36. A simplex line rupture is understood to mean a line rupture either on the inner or outer ring between two neighboring network nodes.

Figure 4:
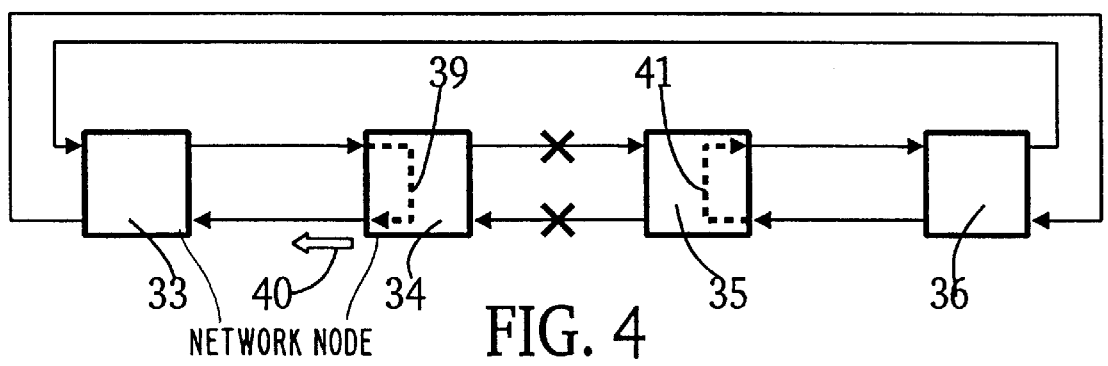

FIG. 4 shows a duplex line rupture or cable rupture. This is understood to mean that between two neighboring network nodes the lines of the inner and outer rings are defective. If a second fault occurs after a simplex cable rupture, as described in FIG. 1, this defect in the outer ring between the network nodes 34 and 35 (FIG. 4) is detected by the network node 34, which then carries out further changes in its status table and sends a message P2 about a fault (first type of message) over the outer ring (arrow 40) to the other network nodes 33, 35 and 36. After the message P2 has been received, the network nodes 33, 35 and 36 change their status tables and evaluate them. Based on the evaluation, the network node 35 creates a loop 41 from the outer to the inner ring. If a defect simultaneously occurs on the inner as well as on the outer ring between the network nodes 34 and 35, the network nodes detecting a fault simultaneously send the messages over the two rings, which messages are then consecutively processed in each network node in analogous manner.

Figure 3:
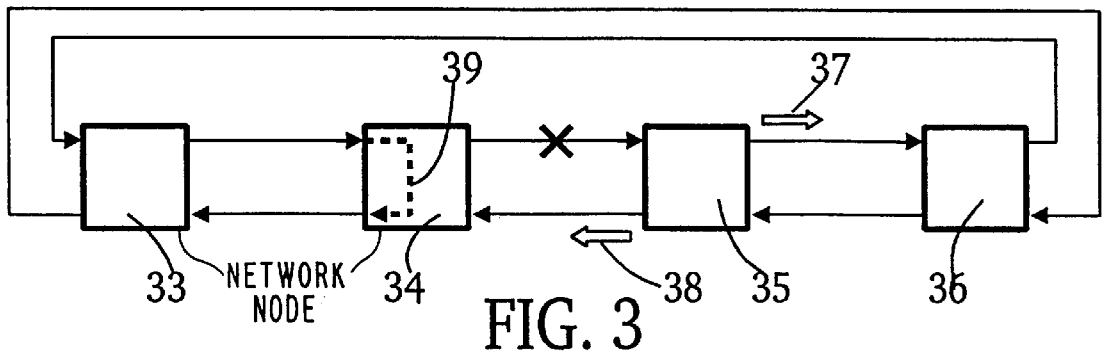
Figure 5:
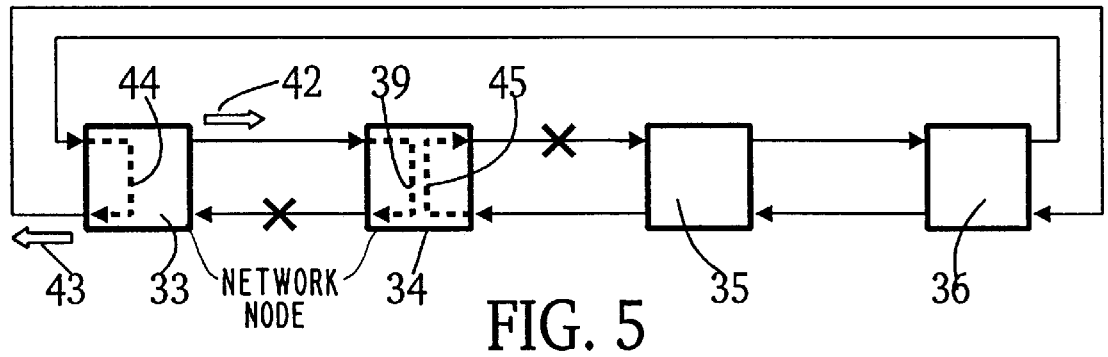

In the following it is assumed that a defect of the inner ring has occurred between the nodes 34 and 35 as shown in FIG. 3. A further line rupture occurs in the outer ring between the network nodes 33 and 34 (FIG. 5). The second defect is detected by the network node 33. This network node 33 carries out respective changes of its status table and sends out messages P3 (first type of message) about a defect (arrows 42 and 43) to the other network nodes over the inner and the outer ring. After the status table entries have been renewed, the network node 33 evaluates the status table and detects that there is already a defect on the inner ring between the network nodes 34 and 35 and that therefore the network node 34 is isolated because of the second defect. An isolation of a node means that it can still receive cells, but cannot send cells. Cells assigned to certain connections between, for example, two users and which do not belong to the assigned station of the isolated node cannot pass the isolated node or run through it. An isolated node is considered a lost node by its neighboring network nodes. As observed earlier, a lost node no longer sends cells over its transmitting lines, which may be detected by the detection of a loss of synchronization or with the aid of signalling cells. An isolated node's neighboring node, however, always detects a line rupture. To this end, the network node 33 creates a loop 44 from the inner to the outer ring, makes respective status table entries and sends messages P4 (second type of messages) about a loop action (again denoted by the arrows 42 and 43) over the two rings.

After the network node 34 has received the message P3 from the network node 33, corresponding status table entries are made. The network node 34, after checking the tables, then establishes that it is isolated and creates a loop 45 from the outer to the inner ring (FIG. 5). This loop is necessary when later on the defect is remedied and the ring system changes to a normal condition step by step. After the message P4 has been received, the contents thereof are stored in the status table of the network node 34. In this respect it should be borne in mind that the node 33 can still reach node 34.

The network node 35 also changes its status table entries after the message P3 has been received and detects that the node 34 is isolated. It creates a loop 46 from the outer to the inner ring, enters this in its status table and sends a message P5 (second type of message) via a loop action (arrows 47 and 48) to all the other network nodes. The network nodes 33, 34 and 36 receive this message P5, enter it in their respective status table and evaluate it. The result of the evaluation is that no further action needs to be carried out.

In the exemplary embodiment described above, the network node 33 detects the second line rupture on the outer ring between the network nodes 33 and 34 after this network node 33 has received the message P1 about the first line rupture between the network nodes 34 and 35 from the network node 35. However, if the network node 33 first detects the second line rupture before receiving the message P1, a status table entry is made as described above and a message P3 is sent out. After the message P1 has been received, its contents are added to the respective status table in network node 33.

Even when the network nodes 33 and 35 simultaneously receive a message, this does not cause any problem. After the evaluation of the received messages, both network nodes detect that the network node 34 is isolated and then send the message P3, P4 or P5, respectively.

Figure 7:
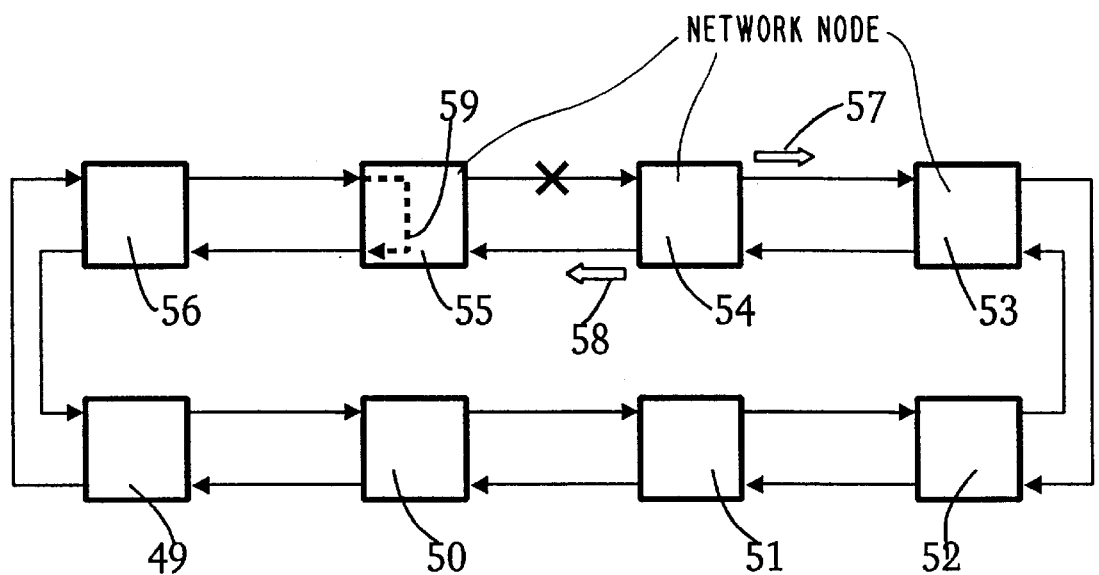

If a line rupture occurs on an inner and an outer ring and a plurality of network nodes are located between the defective lines, two sub-ring systems comprising an isolated group of network nodes, as will be shown in the following with reference to FIGS. 7 to 10, will arise after a reconfiguration of the ring system. An isolated group of network nodes can no longer send cells to another sub-system. FIGS. 7 to 10 show a ring system comprising eight network nodes 49 to 56. It is assumed, as shown in FIG. 7, that a line rupture has arisen on the outer ring between the network nodes 54 and 55. The network node 54, which is to receive cells from the network node 55 over the outer ring, detects the defect, makes respective entries in its status table and informs the other network nodes 49 to 53, 55 and 56 by means of a message P6 (first type of message) about an error (arrows 57 and 58), which message is sent over the outer and the inner ring. After receiving the message P6, the network node 55 changes the entries of its status table, evaluates the status table and creates a loop 59 from the outer to the inner ring. The other network nodes 49 to 53 and 56 update their status tables too after receiving the message P6. A subsequent evaluation of the respective status tables in the network nodes 49 to 53 and 56, however, shows that no further action needs to be taken.

Figure 8:
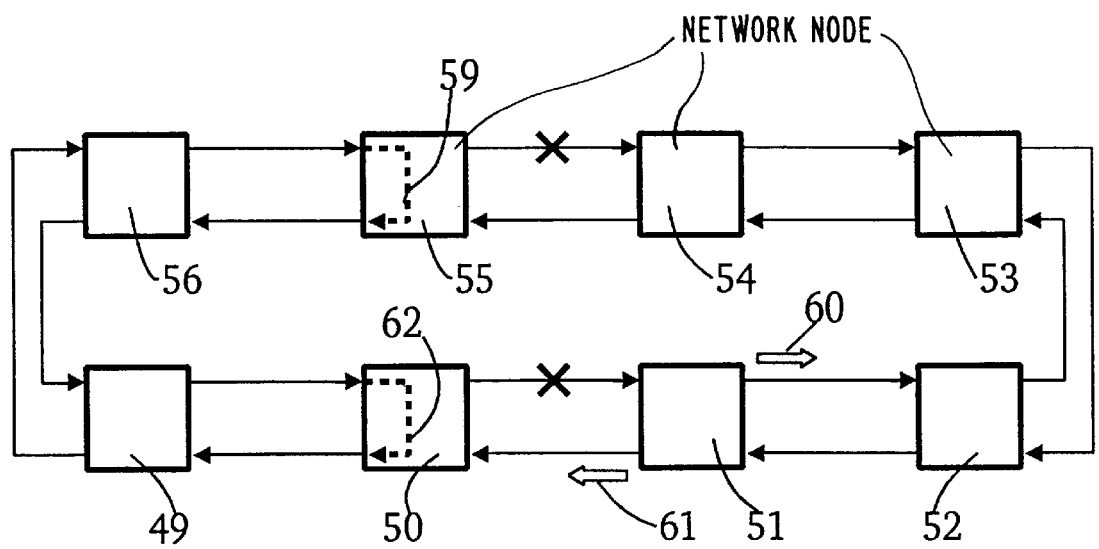

Furthermore, it is assumed that a second line rupture then occurs on the inner ring between the network nodes 50 and 51, as is shown in FIG. 8. The network node 51 detects the fault, changes the entries in the status table and informs the other network nodes 49, 50 and 52 to 56 about a fault (arrows 60 and 61) by means of a message P7 (first type of message) which is sent over the two rings. After receiving the message P7, the network node 50 updates its status table as do all the other network nodes 49 and 53 to 56, evaluates it and forms a loop 62 from the inner to the outer ring on the basis of the evaluation.

Figure 9:
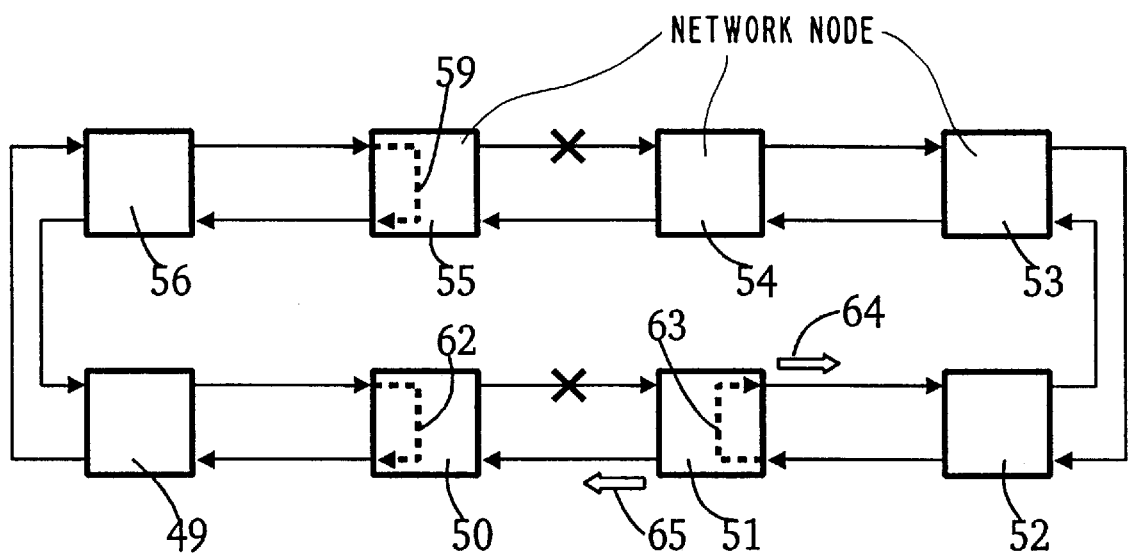
Figure 10:
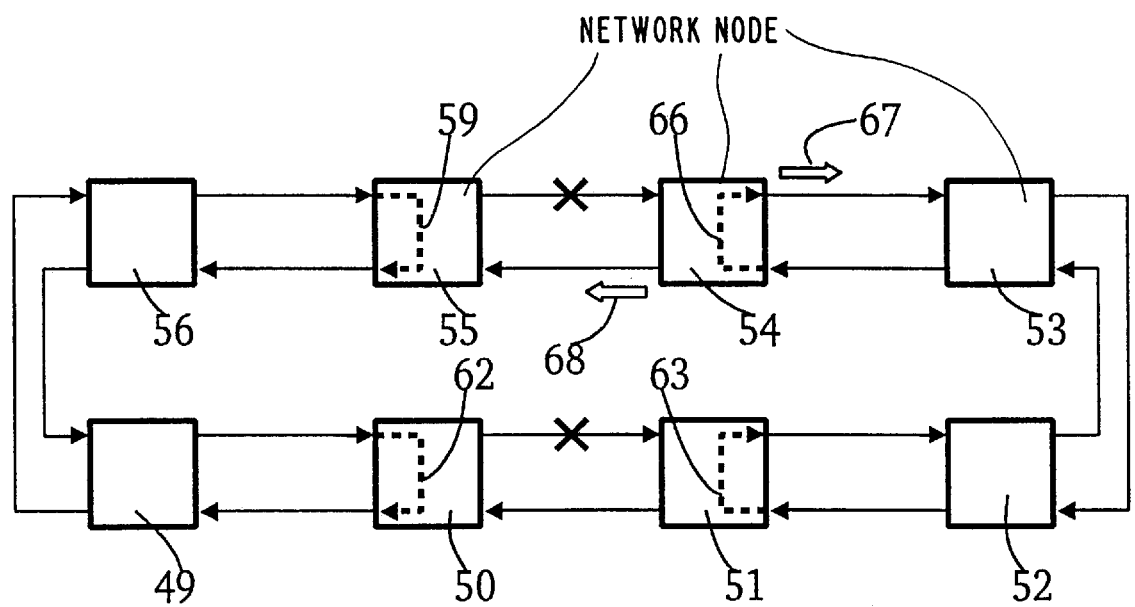

Based on the entries of its status table, the node 51 detects that the nodes 51 to 54 can no longer receive cells from the nodes 49, 50, 55 and 56 because of the second line rupture, represent an isolated node group and thus sub-ring systems are to be formed. Subsequently, as is shown in FIG. 9, the network node 51 forms a loop 63 from the outer to the inner ring and informs all the other network nodes 49 to 51 and 53 to 56 by means of a message P8 (second type of message) about a loop action (arrows 64 and 65).

The network node 54 first receives the message P7 and then the message P8. After receiving the message P7, the network node 54 determines that a sub-system is to be formed. The network node 54 also forms the loop 66 from the inner to the outer ring and sends messages P9 (second type of messages) about a loop action (arrows 67 and 68) to all the other network nodes 49 to 53, 55 and 56. In all the network nodes 49 to 56, all the respective status tables are adapted and evaluated. No further action takes place in the network nodes 49 to 56.

In all the network nodes 49 to 56, the respective status tables then have the same entries. The same status in all the status tables occurs at any rate with one or two line ruptures which have occurred on different rings and which are described above. If a plurality of line ruptures are found on one ring only, the status in the respective status tables of the network nodes will be the same. If more than two line ruptures occur on different rings, the same status in all the status tables may possibly not be achieved.

When a local area network is initialized (after it has been taken into operation or reset), for example each network node sends its individual predefined address in a message in a cell stream over the inner or outer ring. Each network node of the ring inserts its respective address in a predefined order into the message. On receiving back the message which the network node that has originally sent, this network node evaluates the contents of the message and then knows the order of the addresses of all the network nodes of the ring system on the inner or outer ring, respectively. Each network node determines the network node having the smallest address and assigns the cyclic node number O(CNN)O to this network node. Subsequently, the cyclic node numbers 1, 2, 3, ... R−1, where R∈N is the number of the network nodes in the ring system, are assigned to the other network nodes in the direction of the cell stream, for example, along the inner ring. For example, the network nodes neighboring the network node having CNN 3 have CNN 2 and CNN 4 or, when the ring system comprises only four network nodes, CNN 0.

The status table inside a network node, which table forms, for example, part of the control arrangement 8, has entries for each network node of the ring system. The table is then ordered according to cyclic node numbers. For example, the table has not only a column stating the CNN, but also a column which shows whether there is a rupture in the transmitting line of the inner ring which line is connected to the respective network node. A further column is used for indicating a line rupture on the outer ring. For example, the entry 3, 0, 1 is understood to mean that there is a rupture in the transmitting line of the outer ring of the network node having CNN 3 and that a loop in the network node is formed with CNN 3, so that the inner ring can no longer be reached. The entry 3, 0, 1 may also be understood to mean—as already observed above—that only one loop is created without a line being ruptured. This may be the case when an isolated network node or an isolated group of network nodes has arisen and is treated as such.

As described with reference to FIGS. 3 to 10, a message is generally sent over the inner and outer ring when a line rupture or a loop action is detected. For this purpose, a user cell is used which contains the above details in its information field. A message, for example, of the first type in a user cell contains a pattern having a CNN and the location of the fault (inner or outer ring). When the fault has occurred on the inner ring, the detecting network node i (for example, network node 37 in FIG. 3), where i=0 ... R−1, inserts, while assuming that the cyclic node number CNN has been issued in the direction of the cell stream of the inner ring, the information [$\mod_R(i-1),1,0$] into a user cell, where $\mod_R(k)$ indicates the remainder after a division of k by R. When the detecting network node i detects a fault on the outer ring, the information [$\mod_R(i+1),0,1$] is inserted into a user cell under the assumption that the cyclic node number CNN has been issued in the direction of the cell stream in the inner ring. The user cells are transferred to all the other network nodes of the ring system. The network nodes receiving the cell that contains the information enter the received information in their respective status table. A network node then recognizes from the entries in the status table what action has taken place in another network node. For example, the entry [$\mod_R(i),1,0$] means that the network node has formed a loop from the inner to the outer ring or will switch directly. In the event of a simplex or duplex line rupture, the loop is formed because of a line rupture. In the event of an isolated group of network nodes or an isolated node, such an entry may also mean that a loop is formed without there being a line rupture.

After a change in the status table, status changes and also changes in the path memories 27 to 29, for example, for forming a loop, are carried out. If a single line rupture has occurred, the status table is verified in each network node having a CNN K, K∈{0,1,2, ... ,R−1}, where R indicates the number of network nodes of a ring system. In the network node having CNN i, whose transmitting line of the inner or outer ring has a rupture, forms a loop in which the tables of the respective path memories 27 to 29 in the network node having CNN i are changed. In the other network nodes having CNN 0, 1, 2, ... , i−1, i+1, ... , R−1, no further action is taken.

In the following, a method is proposed which makes it possible to start all the necessary actions in the event of two or more line ruptures. First two sets U and D are defined for this purpose. The set U denotes the CNN of all the nodes at which a line rupture has occurred on their respective transmitting line of the inner ring, and the set D denotes the CNN of all the nodes at which a line rupture has occurred on their respective transmitting line of the outer ring. In the case where a line rupture has occurred on the transmitting line of the inner ring of the network node having CNN 2, U={2} and D=∅ (empty set).

Let us assume that two line ruptures have occurred. When U=∅, a fault will have occurred on transmitting lines of the outer ring of two network nodes having CNN i and j (i j), i,j∈0, ... ,R−1. The network node i at which a line rupture has occurred first and which has already formed a loop has first set a mark "LoopbackOIdone" and, therefore, does not take any further action when it evaluates its status table about the second line rupture after the pattern has been entered. The network node j does not find a set mark, forms a loop from the outer to the inner ring and sets a mark "LoopbackIOdone".

When a second line rupture has occurred and D=∅, a defect has occurred on transmitting lines of the inner ring of two network nodes having CNN i and j (i j). The network node i at which a line rupture has occurred first and which has already formed a loop, has previously set a mark "LoopbackIOdone" and does not take any further action after the status table has been evaluated, which status table additionally contains the entry about the pattern of the second line rupture. The network node j does not find any set mark, forms a loop from the inner to the outer ring and sets a mark "LoopbackIOdone".

Figure 6:
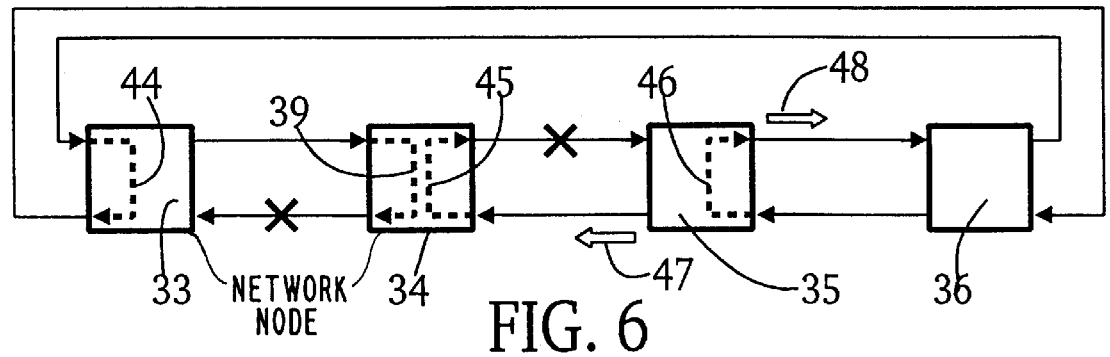

If a line rupture has occurred on the inner and on the outer ring, the two sets U and D are not empty, that is to say, U={u} and D={d}. Each network node having a CNN K, K∈{0,1,2, ... ,R−1} evaluates the status table after the second line rupture. The following three cases A, B and C may then occur:

A) In the first case, u=d, that is to say, a network node having a CNN u=d is isolated, as is represented in FIGS. 5 to 6. The two (inner and outer ring) transmitting lines of this node have a line rupture. After the second line rupture, each network node K evaluates its status table:

A1) If K=u=d, the network node having CNN K is the isolated network node in which a mark "CurrentNodeIsolated" is set.

A2) If K=$\mod_R(u+1)$, the network node having CNN K is the neighboring network node in the direction of the cell stream on the inner ring, in which a mark "NeighborIsolatedNodeOI" is set. This network node having CNN K forms a loop from the outer to the inner ring (compare FIG. 6) after the evaluation of set marks described above.

A3) If K=$\mod_R(d-1)$, the network node having CNN K is the neighboring network node in the direction of the cell stream on the outer ring in which a mark "NeighborIsolatedNodeIO" is set. This network node having CNN K forms a loop from the inner to the outer ring (compare FIG. 5) after set marks have been evaluated in the manner described below.

Figure 11:
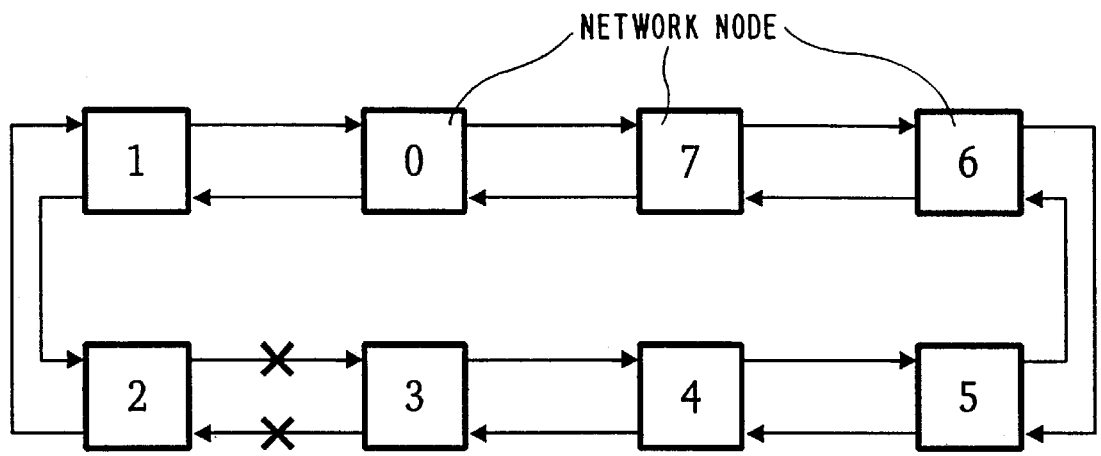

B) In the second case, $\text{mod}_R(u+1)$ is assumed to be equal to d, that is to say, there is a duplex line rupture. An example of such a duplex line rupture is shown in FIG. 11 in which eight network nodes having CNN 0 to 7 are shown. A line rupture has arisen on the inner and the outer ring between the network nodes having CNN 2 and CNN 3. Thus, u=2 and d=3. The transmitting line of the inner ring and the receiving line of the outer ring of the network node having CNN u, or the transmitting line of the outer ring and the receiving line of the inner ring of the network node having CNN d have a line rupture. Each network node K evaluates its status table after the second line rupture.

B1) If K=d, the network node having CNN K sets a mark "DuplexLineBreakOI". This network node forms a loop from the outer to the inner ring when this loop had not already been formed subsequent to a previous message of the first type after set marks have been evaluated in the manner to be described below.

B2) If K=u, the network node having CNN K sets a mark "DuplexLineBreakIO". This network node forms a loop from the inner to the outer ring when this loop has not already been formed subsequent to a previous message of the first type after set marks have been evaluated in the manner to be described below.

Figure 12:
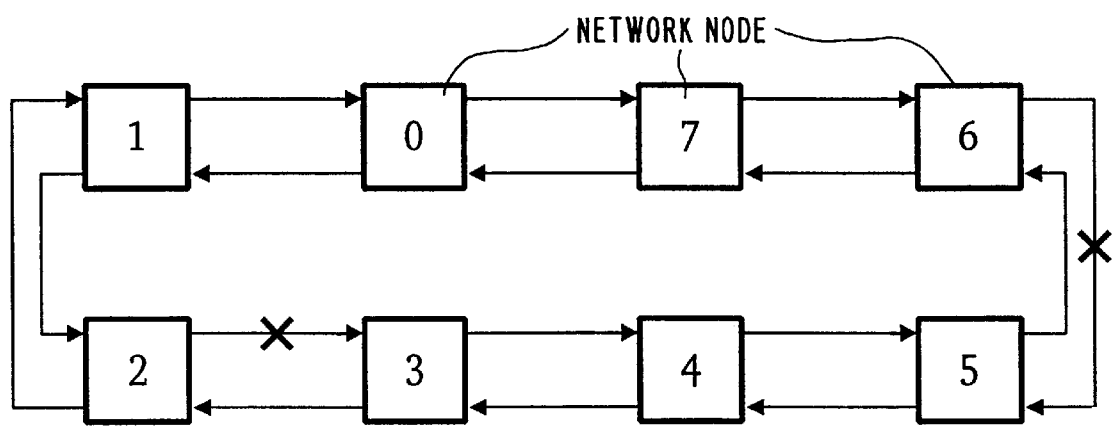

C) In the third case, there is an isolated group of network nodes as a result of which two sub-systems are developed as are shown in FIGS. 7 to 10. FIG. 12 shows a further example comprising eight network nodes denoted CNN 0 to 7. There is a line rupture on the outer ring between the network nodes having CNN 5 and CNN 6 and on the inner ring between the network nodes 2 and 3. An isolated group of network nodes comprises two edge nodes. A first edge node, which will be referenced outer edge node, is the network node that has a line rupture in the transmitting line of the outer ring. A second edge node which will be referenced inner edge node in the following is the network node that has a line rupture in the transmitting line of the inner ring. In FIG. 12, the isolated group is formed by the network nodes 6, 7, 0, 1 and 2. The second sub-system that arises comprises the network nodes 3, 4 and 5.

C1) If the network node having CNN K satisfies the condition $$\text{mod}_R(K-d)+\text{mod}_R(u-K) \leq R-1,$$

the network node belongs to an isolated group of network nodes.

C1a) If K=d, the network node having CNN K is the outer edge node. This edge node sets a mark "EdgeNodeClosedLoopOI" and forms a loop from the outer to the inner ring in so far this loop does not already exist after marks that are set have been evaluated in the manner to be described below.

C1b) If K=u, the network node having CNN K is the inner edge node. This inner edge node sets a mark "EdgeNodeClosedLoopIO" and forms a loop from the inner to the outer ring in so far this loop does not already exist after the marks that are set have been evaluated in the manner to be described below.

C2) If the network node having CNN K does not satisfy the condition $$\text{mod}_R(K-d)+\text{mod}_R(u-K)<R-1,$$

the network node does not belong to an isolated group of network nodes, but to a sub-system.

C2a) If $K=\text{mod}_R(d-1)$, the network node having CNN K is the neighboring network node of the outer edge node of the isolated group. This neighboring network node sets a mark "NeighborClosedLoopIO" and forms a loop from the inner to the outer ring in so far this loop does not already exist, after the marks that are set have been evaluated in the manner to be described below.

C2b) If $K=\text{mod}_R(u+1)$, the network node having CNN K is the neighboring network node of the inner edge node of the isolated group. This neighboring network node sets a mark "NeighborClosedLoopOI" and forms a loop from the outer to the inner ring in so far this loop does not already exist, after marks that are set have been evaluated in the manner to be described below.

After a status table has been evaluated in the network nodes and various marks have been set, the respective marks are interpreted. If the mark "DuplexLineBreakIO" or "DuplexLineBreakOI" is set and no loop has been formed yet, the loop action is carried out first. Subsequently, the mark "loopbackIOdone" or "loopbackOIdone" is set.

When the mark "EdgeNodeClosedLoopOI" or "EdgeNodeClosedLoopIO" is set and an appropriate loop action has not been carried out thus far, the respective loop is formed and the mark "loopbackIOdone" or "loopbackOIdone" is set. The other nodes have already been or will be informed about this action by the message of the first type.

When the mark "NeighborIsolatedNodeOI", "NeighborIsolatedNodeIO", "NeighborClosedLoopOI", or "NeighborClosedLoopIO" is set and a respective loop action has not been carried out thus far, the relevant network node sends to all the other network nodes that can be reached a second type of message that describes the respective action. Then the loop is formed and the mark "loopbackIOdone" or "loopbackOIdone" is set.

When the "CurrentNodeIsolated" mark is set and the respective network node has not yet carried out a loop action, this is made up for, provided that the network node is not out of function (node failure).

The evaluation process defined above may also be used in the case of more than two line ruptures. If U=∅, all the line ruptures have occurred on the outer ring. In that case, if not carried out yet, a loop is formed in the respective network node from the outer to the inner ring and a "loopbackOIdone" mark is set. If D=∅, all the line ruptures have occurred on the inner ring. In that case, if not carried out yet, a loop is formed in the respective network node from the inner to the outer ring and a "loopbackIOdone" mark is set.

If line ruptures occur on the inner and outer ring, this yields the sets $U=\{u_1, u_2, \ldots, u_m\}$ and $D=\{d_1, d_2, \ldots, d_n\}$. In each network node having CNN K, $K \in \{0,1,2, \ldots, R-1\}$, $$S_{min}:=2R, \; i0=2R, \; j0=2R$$

are set and, after that, all the pairs $(u_i, d_j)$ are examined.

For all the pairs $(u_i, d_j)$, where $1 \leq i \leq m$, $1 \leq j \leq n$, the following three cases A, B and C occur similarly to the case of two line ruptures:

A) In the first case, if $u_i=d_j$, the network node having CNN $u_i=d_j$ is isolated.

A1) If $K=u_1=d_j$, the network node having CNN K is the isolated network node in which a "CurrentNodeIsolated" mark is set.

A2) If $K=\text{mod}_R(u_i+1)$, the network node having CNN K is the neighboring network node in the direction of the cell stream on the inner ring, in which a "NeighborIsolatedNodeOI" mark is set. After the mark has been evaluated, this network node having CNN K forms a loop from the outer to the inner ring if this does not already exist.

A3) If K=$\mod_R(d_j-1)$, the network node having CNN K is the neighboring network node in the direction of the cell stream on the outer ring in which a "NeighborIsolatedNodeIO" mark is set. If after the evaluation of the mark there is still no loop, the network node having CNN K forms a loop from the inner to the outer ring.

B) In the second case, $\mod_R(u_i+1)$ is assumed to be equal to $d_j$, that is to say, there is at least a double line rupture.

B1) If K=$d_j$, the network node having CNN K sets a "DuplexLineBreakOI" mark. After the evaluation of the mark, this network node forms a loop from the outer to the inner ring if this does not already exist.

B2) If K=$u_i$, the network node having CNN K sets a "DuplexLineBreakIO" mark. After the evaluation of the mark, this network node forms a loop from the inner to the outer ring if this does not already exist.

C) In the third case, there is an isolated group of network nodes. First, each network node is to calculate the equation $$S(i,j)=\mod_R(K-d_j)+\mod_R(u_i-K).$$

Subsequently, $S_{min}$ is set equal to S(i,j), i0 is set equal to i and j0 is set equal to j, if $S(i,j)<S_{min}$. S(i,j) is used for determining the smallest isolated group containing K.

C1) If the network node having CNN K satisfies the condition $$\mod_R(K-d_j)+\mod_R(u_i-K)=R-1,$$

the network node belongs to a certain isolated group of network nodes.

C1a) If K=$d_j$, the network node having CNN K is the outermost edge node of the specific isolated group. This edge node sets an "EdgeNodeClosedLoopIO" mark and after the evaluation of the mark forms a loop from the outer to the inner ring if this loop does not already exist.

C1b) If K=$u_i$, the network node having CNN K is the inner edge node of the specific isolated group. This inner edge node sets an "EdgeNodeClosedLoopIO" mark and after the evaluation of the mark forms a loop from the inner to the outer ring if this loop does not already exist.

C2) If the network node having CNN K does not satisfy the condition $$\mod_R(K-d_j)+\mod_R(u_i-K)<R-1,$$

the network node does not belong to the isolated group of network nodes determined by $(u_i,d_j)$.

C2a) If K=$\mod_R(d_j-1)$, the network node having CNN K is the neighboring network node of the outer edge node of the specific isolated group. After the evaluation of the mark this outer edge node sets a "NeighborClosedLoopIO" mark and forms a loop from the inner to the outer ring if this loop does not already exist.

C2b) If K=$\mod_R(u_i+1)$, the network node having CNN K is the neighboring network node of the inner edge node of the isolated group. This neighboring network node sets a "NeighborClosedLoopOI" mark and after the evaluation of the mark forms a loop from the outer to the inner ring if this loop does not already exist.

After all the pairs $(d_j,u_i)$ have been examined according to said scheme, the network nodes having CNN $d_{j0}$, $\mod_R(d_{j0}+1)$, . . . ,$u_{i0}$, provided that $S_{min}<R-1$, form the smallest isolated group of network nodes which group includes the network node having CNN K. This information may be used for declining new connections between at least two users which are to be set up between nodes of this isolated group and nodes outside the isolated group.

After the associated status tables have been evaluated and various marks have been set in a respective network node, the respective marks are interpreted in the same manner as with the case of two line ruptures and messages about a loop action that has been carried out or is to be carried out are sent.

Figure 13:
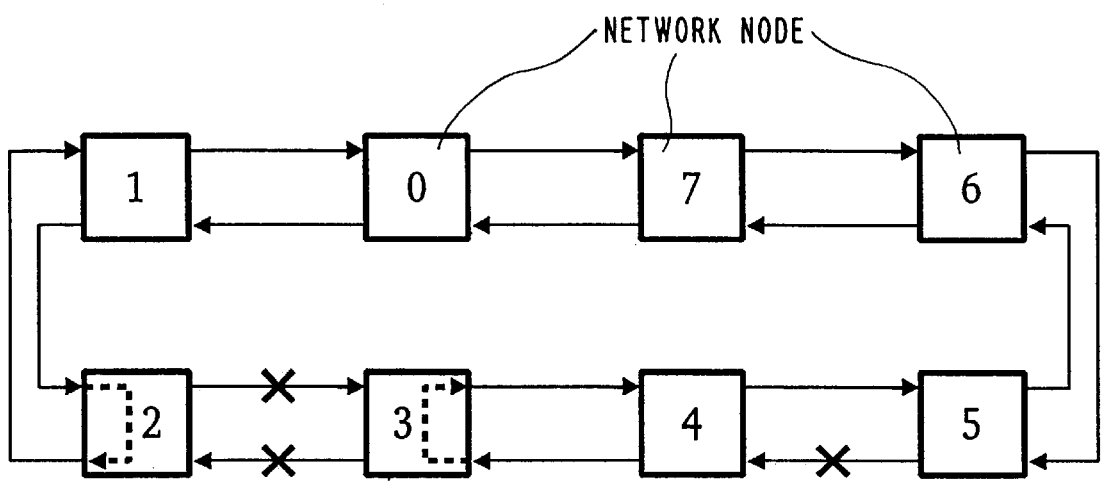

Finally, an example of eight network nodes is considered in which first a duplex line rupture and then a simplex line rupture occurs as is represented in FIG. 13. First a line rupture occurs in the inner and outer ring between the network nodes having CNN 2 and CNN 3. This duplex line rupture is detected, evaluated and respective loops have been formed in the network nodes having CNN 2 and CNN 3. Subsequently, a single line in the outer ring between the network nodes having CNN 4 and CNN 5 is broken. The network node 4 detects the fault, sends a message P10 about a fault with the pattern 5, 0, 1 over the outer and inner ring to the other network nodes and enters this pattern in its status table. The status table then has the following entries:

| CNN | Inner ring (U) | Outer ring (D) |
| --- | --- | --- |
| 2 | 1 | 0 |
| 3 | 0 | 1 |
| 5 | 0 | 1 |

Then the following sets are formed U={2} and D={3,5} and the pairs $(d_1=3, u_1=2)$ and $(d_2=5, u_1=2)$. In the network node having CNN 4 (K=4) (see FIG. 13), the pair $(d_1,u_1)$ is determined so that $$\mod_R(u_1+1)=\mod_8(2+1)=3=d_1.$$

Thus, between the network nodes having CNN 2 and CNN 3 there is a duplex line rupture. Since the CNN of the network node having CNN 4 is neither equal to $d_1$ (=3), nor equal to $u_1$ (=2), no further action is taken by this network node having CNN 4.

For the pair $(d_2,u_1)$ the network node having CNN 4 determines that the network nodes having CNN 5, 6, 7, 0, 1, 2 belong to an isolated group of network nodes. The network node having CNN 4 does not form part of the isolated group of network nodes, because $$\mod_R(K-d_2)+\mod_R(u_1-K)=\mod_8(4-5)+\mod_8(2-4)=13<7=R-1$$

is not satisfied. However, the network node having CNN 4 sets the "NeighborClosedLoopIO" mark because K=$\mod_R(d_2-1)=\mod_8(5-1)=4$.

Figure 14:
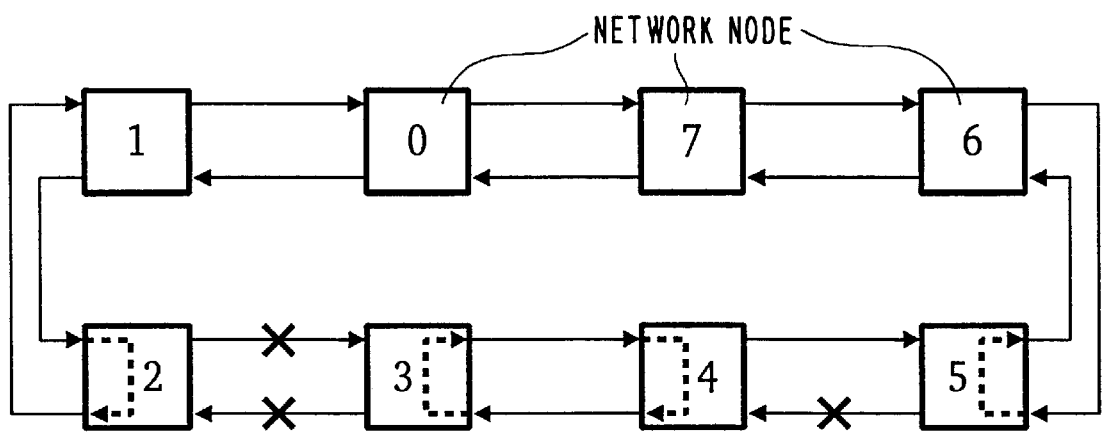

Once the status table has been evaluated, the marks set are considered. The network node having CNN 4 detects that the "NeighborClosedLoopIO" mark is set but not the "loopbackIOdone" mark. Subsequently, an entry 4, 1, 0 is added to the status table, a message P11 about a loop action with pattern 4, 1, 0 is sent, a loop is formed from the inner to the outer ring (compare FIG. 14) and the "loopbackIOdone" mark is set. The status table of the network node having CNN 4 then has the following entries:

| CNN | inner ring (U) | outer ring (D) |
| --- | --- | --- |
| 2 | 1 | 0 |
| 3 | 0 | 1 |
| 4 | 1 | 0 |
| 5 | 0 | 1 |

After the network node having CNN 5 (K=5) has received the message P10, its status table contains the three entries defined above. For the pair $(d_1,u_1)$, as for the network node having CNN 4, there is determined that $$\text{mod}_R(u_1+1)=\text{mod}_8(2+1)=3=d_1.$$

Since the CNN of the network node having CNN 5 is neither equal to $d_1$ (=3), nor equal to $u_1$ (=2), no further action is taken for this pair. For the pair $(d_2,u_1)$ the network node having CNN 5 determines that this network node belongs to the isolated group of network nodes having CNN 5, 6, 7, 0, 1, 2, because $$\text{mod}_R(K-d_2)+\text{mod}_R(u_1-K)=\text{mod}_8(5-5)+\text{mod}_8(2-5)=5<7=R-1.$$

Since $K=d_2$, the network node having CNN 5 is the outer edge node of the isolated group and therefore sets the "EdgeClosedLoopOI" mark. Subsequently, a loop is formed in this network node from the outer to the inner ring (compare FIG. 14) and the "loopbackOIdone" mark is set.

After the network node having CNN 5 has received the message P11 from the network node having CNN 4, the pattern contained in the message P11 is added to its status table. The evaluation of the table with the four entries and the examination of the marks set shows that a further action need not be taken because a loop has already been formed.

The evaluation of the respective status table of the network nodes having CNN 6, 7, 0, 1 and 2, after receiving the message P10 demonstrates that these network nodes belong to an isolated group and no loop action is necessary. The network node having CNN 2 additionally detects after the evaluation of the duplex line rupture that it is the inner network node of the isolated group and subsequently sets the "EdgeNodeClosedLoopIO" mark. After the message P11 has been received, the pattern contained therein is added to the status tables of the network nodes of the isolated group. The evaluation of the status table demonstrates that no further loop action is necessary. The various loops which have been formed after the reconfiguration process may be taken from FIG. 14.

What is claimed is:

1. A local area network operating in the asynchronous transfer mode (ATM) for transmitting cells, comprising a plurality of network nodes, said network being arranged to form a loop in the event of a defect in a transmitting line or a neighboring network node, characterized in that:
   a first of said plurality of network nodes comprises means, responsive to detecting a defect, for transmitting a cell containing a message of a first type about the location of the defect to all other network nodes involved,
   a first node and a second node receiving the message of the first type respectively comprise means for entering the location of the defect in a respective status table, and
   said second node comprises means, responsive to evaluation of the respective status table and determination that a transmitting line from the second node is defective, or that said second node is a node which, because of the defect, is no longer used for exchanging cells with a neighboring network node, for forming a loop in the second node.

2. A network as claimed in claim 1, wherein said network nodes are arranged in a ring system having inner and outer rings for transmitting cells in opposite directions, characterized in that the second node comprises means, responsive to evaluation of the respective status table, for forming a loop from the inner ring to the outer ring if cells can no longer be supplied by a neighboring network node over the assigned receiving line of the outer ring, and cells can no longer be received from said neighboring network node over other network nodes; and for forming a loop from the outer to the inner ring if cells from a neighboring network node can no longer be supplied over said assigned receiving line of the inner ring, and no cells from said neighboring network node can be received via other network nodes.

3. A network as claimed in claim 1, characterized in that said second node comprises:
   means for receiving a message of a second type about a planned formation of a loop in another network node,
   means for entering in the respective status table details regarding the other network nodes and regarding the transmitting line which, because of the formation of the loop, no longer is usable for transmitting cells.

4. A network as claimed in claim 1, wherein said nodes are arranged in a ring system having inner and outer rings for transmitting cells in opposite directions, characterized in that:
   said first node comprises means for detecting that a receiving line connected to said first node no longer supplies any cells, and
   said second node has an identified transmitting line that no longer supplies cells to said receiving line, and said message of the first type contains information about the one of said inner and outer rings to which said identified transmitting line belongs.

5. A network as claimed in claim 4, characterized in that the second network node comprises means for forming a loop from an inner ring to an outer ring after the respective status table of said second node has been evaluated, if the transmitting line of the inner ring from the second node no longer supplies cells, and for forming a loop from the outer ring to the inner ring if the transmitting line of the outer ring from the second node no longer supplies cells.

6. A local area network operating in the asynchronous transfer mode (ATM) for transmitting cells, comprising a plurality of network nodes, said network being arranged to form a loop in the event of a defect in a transmitting line or a neighboring network node, characterized in that each of said plurality of network nodes comprises:
   means, responsive to detecting a defect, for transmitting a cell containing a message of a first type about the location of the defect to all other network nodes involved,
   means, responsive to receiving a message of the first type, for entering the location of the defect in a respective status table,
   a switching device for routing received cells,
   a control arrangement for at least controlling the switching device,
   a control arrangement at least for controlling the switching device and for the changing and evaluation of the status table, and
   means, responsive to evaluation of the respective status table and determination that a transmitting line from the respective node is defective, or that the respective node is a node which, because of the defect, is no longer used for exchanging cells with a neighboring network node, for forming a loop in the respective node.

7. A network as claimed in claim 6, wherein said network nodes are arranged in a ring system having inner and outer rings for transmitting cells in opposite directions, characterized in that each node comprises means, responsive to evaluation of its status table, for forming a loop from the inner ring to the outer ring if cells can no longer be supplied by a neighboring network node over the receiving line of the outer ring connected to the respective node, and cells can no longer be received from said neighboring network node over other network nodes; and for forming a loop from the outer to the inner ring if cells from a neighboring network node can no longer be supplied over the receiving line of the inner ring connected to the respective node, and no cells from said neighboring network node can be received via other network nodes.

8. A network as claimed in claim 6, characterized in that each network node comprises:

means for receiving a message of a second type about a planned formation of a loop in another network node, means for entering in the respective status table details regarding the other network nodes and regarding the transmitting line which, because of the formation of the loop, no longer is usable for transmitting cells.

9. A network as claimed in claim 6, wherein said nodes are arranged in a ring system having inner and outer rings for transmitting cells in opposite directions, characterized in that:

each node respectively comprises means for detecting that a receiving line connected to the respective node no longer supplies any cells, and responsive to determination that a neighboring node has an identified transmitting line that no longer supplies cells to said receiving line, said message of the first type contains information about the one of said inner and outer rings to which said identified transmitting line belongs.

10. A network as claimed in claim 9, characterized in that said neighboring node comprises means for forming a loop from an inner ring to an outer ring after the assigned status table of said neighboring node has been evaluated, if the transmitting line of the inner ring from said neighboring node no longer supplies cells, and for forming a loop from the outer ring to the inner ring if the transmitting line of the outer ring from said neighboring node no longer supplies cells.

11. A network as claimed in claim 1, wherein said nodes are arranged in a ring system having inner and outer rings for transmitting cells in opposite directions, characterized in that:

the second node comprises means for sending a message of a second type, where said message of a second type contains information about the second node and about the ring which, because of the formation of said loop, no longer is used for transferring cells, and said means for sending a message sends said message of a second type via a loop circuit formed in said second node if at least one other network node does not have said information.

12. A network as claimed in claim 6, wherein said nodes are arranged in a ring system having inner and outer rings for transmitting cells in opposite directions, characterized in that:

each network node comprises means for sending a message of a second type, where said message of a second type contains information about the respective node and about the ring which, because of the formation of said loop, no longer is used for transferring cells, and said means for sending a message sends said message of a second type via a loop circuit formed in the respective node if at least one other network node does not have said information.

* * * * *